United States Patent [19]

Bellin

[11] Patent Number: 4,857,916
[45] Date of Patent: Aug. 15, 1989

[54] SYSTEM AND METHOD FOR IDENTIFYING AN INDIVIDUAL UTILIZING GRASPING PRESSURES

[76] Inventor: Robert W. Bellin, 4916 N. Highway 83, Hartland, Wis. 53029

[21] Appl. No.: 19,538

[22] Filed: Feb. 26, 1987

[51] Int. Cl.$^4$ .............................................. G06K 9/00
[52] U.S. Cl. ............................... 340/825.340; 382/2; 382/4; 364/413.01; 340/825.300
[58] Field of Search ........... 340/825.31, 825.3, 825.56, 340/365 A, 825.31, 825.3, 825.34; 361/171, 172; 200/5 A, 5 R, 46, 56 R; 310/338, 339, 800, 330, 318-320; 364/556, 558, 413; 73/862.04, 767, 774; 382/2, 4; 434/155; 128/782

[56] References Cited

U.S. PATENT DOCUMENTS

| | | | |
|---|---|---|---|
| 3,576,537 | 4/1971 | Ernst | 382/2 |
| 3,581,282 | 5/1971 | Altman | 340/825.3 |
| 3,614,737 | 10/1971 | Sadowsky | 382/2 |
| 3,648,240 | 3/1972 | Jacoby et al. | 382/2 |
| 4,032,889 | 6/1977 | Nassimbene | 382/2 |
| 4,107,775 | 8/1978 | Ott | 364/413 |
| 4,206,441 | 6/1980 | Kondo | 382/2 |
| 4,267,728 | 5/1981 | Manley et al. | 73/172 |
| 4,322,163 | 3/1982 | Schiller | 356/71 |
| 4,357,597 | 11/1982 | Butler | 382/2 |
| 4,495,434 | 1/1985 | Diepers et al. | 340/365 A |
| 4,573,193 | 2/1986 | Shuto et al. | 382/2 |
| 4,579,424 | 5/1985 | Kroczynski | 200/5 A |
| 4,634,917 | 1/1987 | Dvorsky et al. | 310/339 |
| 4,673,919 | 6/1987 | Kataoka | 340/365 A |
| 4,709,342 | 11/1987 | Hosoda et al. | 310/338 |

Primary Examiner—Donald J. Yusko
Assistant Examiner—E. O. Pudpud
Attorney, Agent, or Firm—Philip P. Mann; Michael D. Rechtin

[57] ABSTRACT

A system for identifying an individual includes a graspable member and a plurality of pressure sensors at preselected locations on the graspable member for developing a uniquely identifying signal or print indicative of the pressures exerted by an individual's hand in grasping the graspable member. Additional structure is provided for storing a plurality of such pressure indicative signals and for comparing the stored signals against later acquired signals in order to verify the identity of an individual.

20 Claims, 4 Drawing Sheets

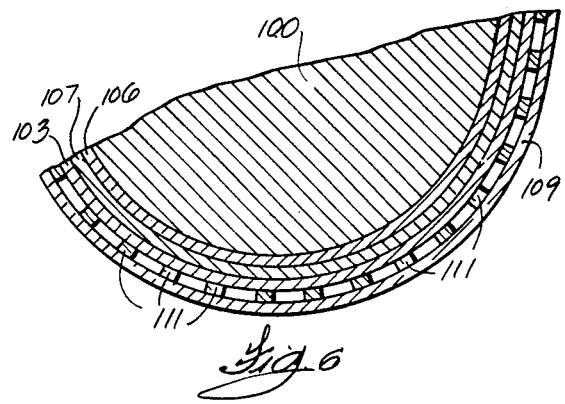
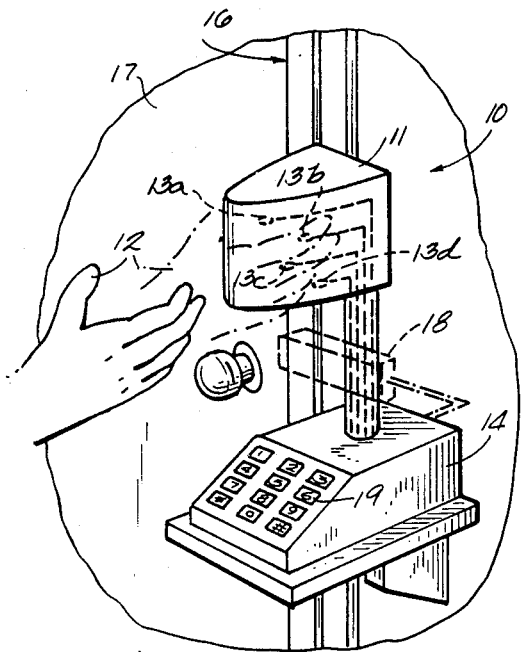
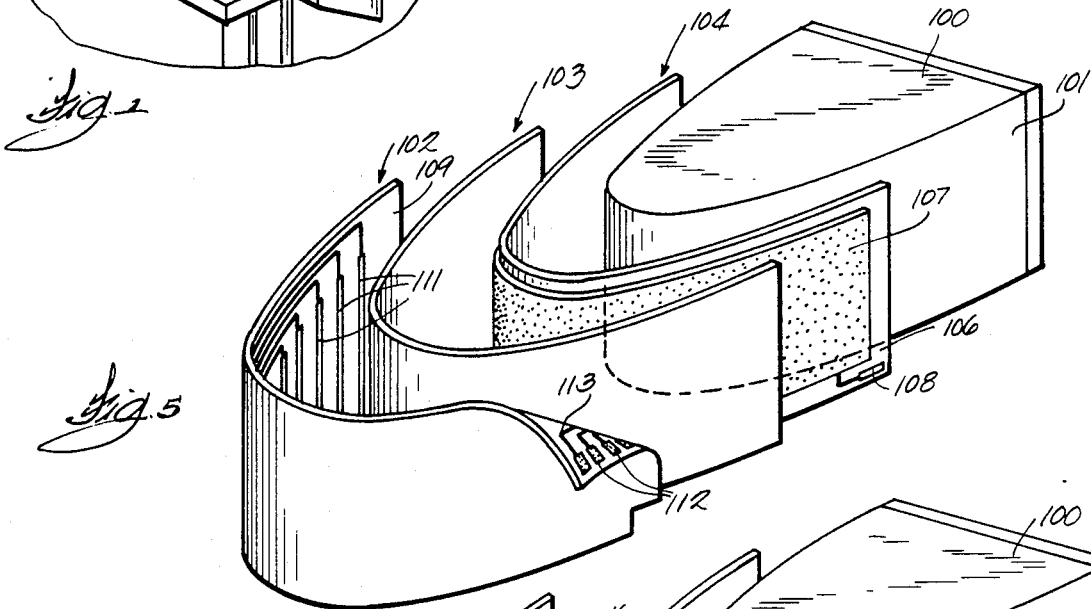
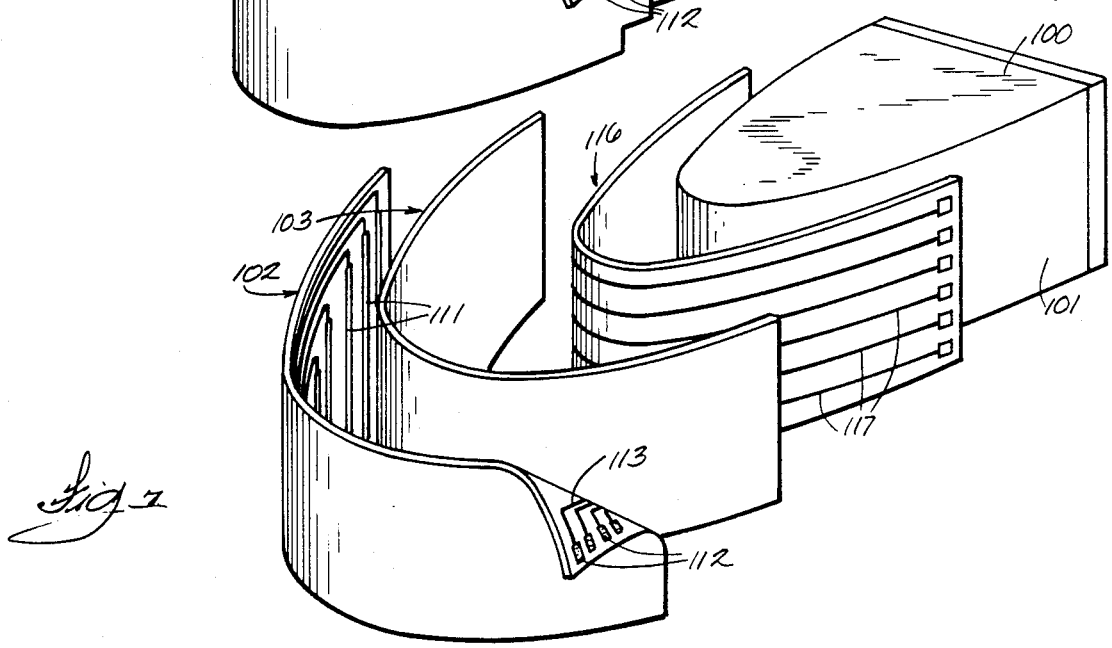

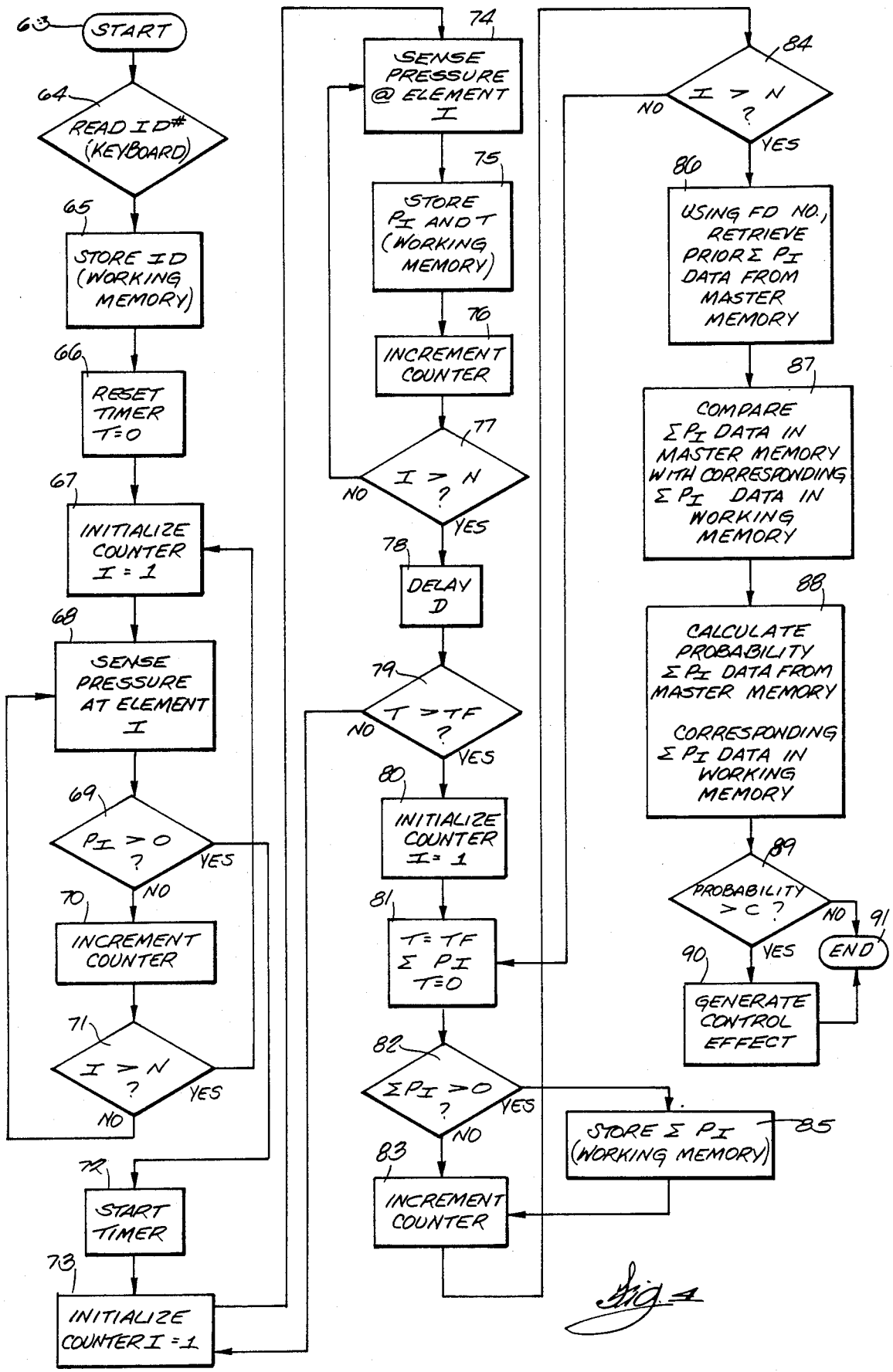

SYSTEM AND METHOD FOR IDENTIFYING AN INDIVIDUAL UTILIZING GRASPING PRESSURES

BACKGROUND OF THE INVENTION

This invention relates generally to systems and methods for identifying an individual and particularly to identification systems and methods wherein identification is made through measurement of the pressures exerted on an object by an individual's hand during grasping.

Numerous systems and methods have, from time to time, been proposed for verifying the identity of an individual through inspection of various uniquely identifying characteristics of the individual's hand. In one known system, described in U.S. Pat. No. 4,322,163, a person's fingerprints are optically scanned by means of a collimated light beam and then converted to an electrical signal representing fingerprint information. Although utilization of fingerprint information as a means of verifying identity is particularly advantageous in that the fingerprint is a highly reliable indicator of identity, systems based on automatic acquisition of fingerprint information are disadvantageous in that complex and expensive optical techniques are required to automatically acquire such information, and the negative image frequently associated with fingerprinting in general might cause people to fear automatic acquisition, storage and analysis of their fingerprint information.

In other personal identification systems, such as those shown, for example, in U.S. Pat. Nos. 4,206,441 and 4,032,889, the contour of a person's hand is used as the basis for identification. In still other systems, such as those shown, for example, in U.S. Pat. Nos. 4,573,193, 3,648,240 and 3,576,537, various characteristics of an individual's hand, such as finger length, finger spacing, and palm dimension are measured in order to identify the individual.

Although each of the foregoing systems avoids the particular drawbacks associated with the use of fingerprint information as a basis for identification, each of these systems requires the use of various, complex, indexing mechanisms to physically fix the location of the hand during measurement. Furthermore, the requirement that the individual blindly place his hand into an oftentimes enclosed measuring apparatus can be psychologically disturbing.

Attention is also directed to the following U.S. Patents:
No. 4,357,597, Butler, Nov. 2, 1982
No. 4,267,728, Manley, et al., May 19, 1981
No. 4,107,775, Ott, Aug. 15, 1978
No. 3,614,737, Sadowsky, Oct. 19, 1971
No. 3,581,282, Altman, May 25, 1971

The present invention seeks to avoid the drawbacks associated with prior hand identification systems by making identification through measurement and analysis of the pattern of forces exerted by an individual's hand in grasping an object. Because such measurement does not rely on fingerprint information and can be effected simply by having the individual grasp a free-standing, exposed, sensing member, the psychological drawbacks of the prior systems are largely avoided. Furthermore, because precise placement of the hand on the sensing member is far less critical than in prior systems, practical construction of the present identification system is greatly simplified.

In view of the foregoing, it is a general object of the present invention to provide a new and improved system and method for identifying an individual.

It is a further object of the present invention to provide a system and method for identifying an individual wherein the drawbacks associated with fingerprint-based systems, and systems requiring insertion of the hand into an enclosed measuring apparatus, are largely avoided.

It is a still further object of the present invention to provide a new system and method for identifying an individual wherein construction is simplified through elimination of complex structure for optically scanning fingerprints or for physically indexing the hand relative to a measuring surface.

SUMMARY OF THE INVENTION

The invention provides a system for identifying an individual comprising a graspable member and sensing means for sensing the pressure exerted at preselected locations on the graspable member when the graspable member is grasped by the individual's hand.

The invention also provides a system for verifying the identity of an individual comprising a graspable member, an array of pressure-sensitive elements disposed at preselected locations on the graspable member and operable to sense the magnitude of pressures externally applied to the graspable member at the preselected locations over a given period of time, signal means coupled to the sensing elements for developing a signal indicative of the magnitudes and locations of the pressures exerted on the graspable member when the graspable member is grasped by the individual's hand, storage means for storing a previously acquired signal indicative of the magnitude and location of pressures exerted by an individual's hand in grasping a member similar or identical to the graspable member, and comparator means for comparing the signal against the previously acquired signal so as to provide a control effect when the signal and the previously acquired signal are substantially similar.

The invention also provides a method of identifying an individual comprising the steps of providing a graspable member and sensing the magnitude and relative locations of pressures exerted on the graspable member by the individual's hand when the graspable member is grasped by the individual.

In one embodiment, the system further comprises storage means for storing and retrieving the signal for subsequent use.

In one embodiment, the system further comprises comparator means for retrieving the stored signal from the storage means, comparing the stored signal against a subsequently acquired signal developed by the sensing means, and for developing a control effect when the subsequently acquired signal substantially matches the stored signal.

In one embodiment, the system further comprises user input means for receiving a prearranged input code uniquely associated with a particular individual and for retrieving, from the storage means, a particular one of the stored signals for comparison by the comparator means against a currently developed signal developed by the sensing means such that the control effect is developed if the currently developed signal matches the particular signal associated with the particular individual.

In one embodiment, the graspable member comprises a generally U-shaped mandrel dimensioned so as to be readily graspable by an individual's hand and formed of a rigid, relatively non-deformable material.

In one embodiment, the mandrel includes an outer surface and the pressure sensing elements are disposed over the mandrel at fixed locations on the outer surface.

In one embodiment, the pressure sensing elements comprise a plurality of electrical conductor pairs, each separated by a deformable, electrically resistive, material such that electrical impedance between the conductors in each of the pairs is indicative of the pressure exerted on the conductor pair.

In one embodiment, the sensing elements are each elongate in form and the preselected locations comprise a plurality of substantially parallel spaced line segments on the outer surface of the mandrel.

In one embodiment, the sensing elements are substantially point-like in form and the preselected locations comprise a plurality of spaced points on the outer surface of the mandrel.

In one embodiment, the method further comprises the steps of comparing the sensed magnitudes and relative locations of pressures exerted on the graspable member by the individual's hand against a previously acquired reference, and providing a control effect when the sensed magnitudes and relative locations substantially match the previously acquired reference.

A principal feature of the invention is the provision of a system and method for identifying an individual wherein the pattern of forces (i.e., strength and location over a period of time) exerted by the individual's hand in grasping an object is sensed and analyzed in order to identify the individual.

Various other principal features of the invention will become apparent to those skilled in the art upon review of the following detailed description, claims and drawings.

BRIEF DESCRIPTION OF THE DRAWINGS

FIG. 1 is a diagrammatic perspective view of an identification system which embodies various of the features of the invention.

FIG. 4 is another flow chart diagram useful in understanding the operation of the identification system shown in FIGS. 1 and 2 during verification of an individual's identity.

FIG. 5 is an exploded perspective view of a graspable pressure-sensing member constructed in accordance with one aspect of the invention.

FIG. 6 is a partial cross-sectional view of the graspable pressure-sensing member shown in FIG. 5 useful in understanding the construction and operation thereof.

FIG. 7 is an exploded perspective view of another graspable pressure-sensitive member constructed in accordance with another aspect of the present invention.

Figure 2:
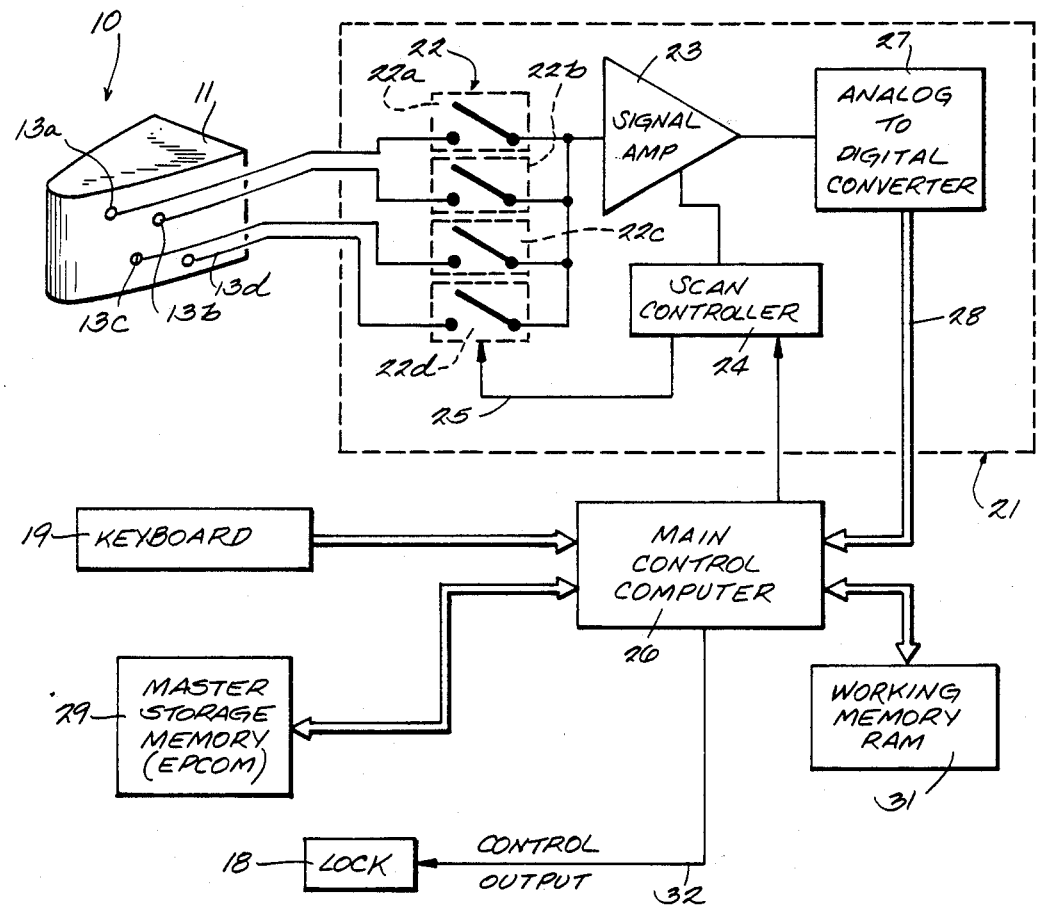
FIG. 2 is a system block diagram useful in understanding the operation of the identification system shown in FIG. 1.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DESCRIPTION OF THE PREFERRED EMBODIMENT

A system 10 for identifying an individual is illustrated in the drawings. The system 10 embodies the invention and, as best shown in FIG. 1, generally includes a graspable member 11 and sensing means for sensing the pressure exerted at preselected locations on the graspable member 11 when the graspable member is grasped by an individual's hand 12. While various suitable sensing means can be employed, in the preferred embodiment, the sensing means includes a plurality of individual pressure sensors 13a–13d disposed at preselected locations on the graspable member 11. Each of the pressure sensors 13a–13d functions to develop a signal indicative of the magnitude of pressure externally applied to that sensor. Thus, knowledge of the preselected locations, combined with the pressure indicative signals developed by the individual pressure sensors, provides sufficient information to determine the magnitude of externally applied pressures at each of the preselected locations. Accordingly, the graspable member 11, in combination with the pressure sensors 13a–13d, can function to sense the pattern of pressures exerted by an individual's hand during grasping to provide a pressure pattern or "print" that is unique to the individual.

For purposes of clarity, only relatively few of the pressure sensors 13 are shown in the diagrammatic view of FIG. 1. It will be appreciated, however, that in practice it is desirable to improve resolution by providing a multitude of closely spaced pressure sensors over the entire surface on which the hand is placed when the graspable member 11 is grasped.

To permit the acquisition and storage of various acquired pressure "prints," the identification system 10 further includes storage means for storing the pressure indicative signals developed by the pressure sensors 13a–13d and for retrieving the signals for subsequent use in identifying an individual. To provide a useful output when a particular identification is made, the identification system 10 further comprises comparator means for retrieving the stored signal from the storage means, comparing the stored signal against a subsequently acquired signal developed by the pressure sensors 13a–13d, and for developing a desired control effect when the subsequently acquired signal substantially matches the stored signal. Preferably, both the storage means and the comparator means comprise a digital, microprocessor-based circuit electrically interconnected with the pressure sensors 13a–13d of the graspable member 11.

In the embodiment illustrated in FIG. 1, the identification system 10 is configured so as to control access through a doorway 16. The doorway includes a door 17 which can be releasably latched in a closed position by means of an electrically actuated locking mechanism 18. To control access through the doorway 16, the identification system 10 functions to maintain the locking mechanism 18 in a latched condition until a person seeking access through the doorway grasps the graspable member 11 and the system 10 recognizes the resulting pattern of grasping forces or "print" as that developed by a person having authority to pass through the doorway 16.

To facilitate the verification of an individual's identity, the identification system 10 further includes user-actuated input means for receiving a prearranged input code uniquely associated with a particular individual and for retrieving, from the system memory, a particular one of the stored signals for comparison against a currently or presently developed signal provided by the graspable member 11. To this end, the identification system 10 includes a user-actuable keyboard 19 through which a person seeking access through the doorway 16 can enter a unique input code or identification number. Within the identification system 10, the code is utilized as a preliminary indication of the purported identity of the individual, and this information is used to retrieve, from memory, a previously acquired and stored signal or "print" indicative of the grasping pressures developed by the particular individual associated with the particular unique input code. Next, the retrieved signal is compared against a currently or presently developed signal or "print" generated as the individual grasps the graspable member 11. In the event of substantial similarity between the currently developed and previously stored "prints," the identification system 10 provides a control effect which, in the illustrated embodiment, comprises signalling the locking mechanism 18 to unlatch and thereby permit the door 17 to be opened.

The internal configuration of the identification system 10 is illustrated in the functional block diagram of FIG. 2. As indicated, each of the pressure sensors 13a–13d disposed over the graspable surface of graspable member 11, is coupled to a signal generating circuit, indicated generally by reference numeral 21, which functions to develop a signal indicative of the magnitude and locations of the pressures exerted on the graspable member 11 once the graspable member is grasped by an individual's hand. Within the signal generating circuit 21, each of the pressure sensors 13a–13d is coupled, through an individual channel 22a–22d of a multi-channel, sequentially actuable, analog gate or switch 22, to the input of a signal amplifier 23. Each of the channels 22a–22d of the analog gate 22 operates substantially as a single-pole, single-throw switch or relay and serves, when closed in response to an appropriate control signal, to electrically couple an individual one of the pressure sensors 13a–13d to the input of the signal amplifier 23.

To control the operation of the analog gate 22, the signal generating circuit 21 includes a scan controller 24 having an output 25 coupled to the analog gate 22. When enabled, the scan controller 24 functions to generate control signals for sequentially closing each of the analog gate channels 22a–22d for a predetermined period such that no more than one of the channels is closed at any given time.

Overall operation of the identification system 10 is controlled by a main control computer 26. Although various known computers can be successfully adapted for use in the identification system 10, in the illustrated embodiment the main control computer is preferably microporcessor-based so that the identification system 10 can comprise a self-contained, stand-alone system. Alternatively, the main control computer 26 can comprise a remotely located central computer coupled, through suitable communications media, such as metallic wire, photon-based fiber optic cable, or radio or microwave link, to a plurality of individual graspable members 11 at various locations so as to provide an identification system suitable for covering multiple access points over a wide geographic area.

To convert the analog signals developed by each of the pressure sensors 13a–13d into a form usable by the main control computer 26, the signal generating circuit 21 includes an analog to digital converter 27 having an input coupled to the output of the signal amplifier 23 and having a data output 28 coupled to the main control computer 26.

In the system block diagram of FIG. 2, the storage means for storing the pressure indicative signal developed by the pressure sensors 13a–13d includes a master storage memory 29 which, in the embodiment illustrated, comprises an erasable programmable read-only memory (EPROM). In addition to the master storage memory 29, the identification system further includes a working memory 31 comprising a random access memory (RAM). While the master storage memory 29 is used primarily for the long-term storage of acquired grasping pattern signals or "prints", the working memory 31 is used primarily on a short-term basis during initial acquisition of such grasping pressure "prints" and during comparison of recently acquired "prints" against those previously acquired and stored in the master storage memory 29.

As further illustrated in FIG. 2, the user-actuable keyboard 19 is also coupled to the main control computer 26. To control actuation of the electrically actuated locking mechanism 18, the main control computer 26 is coupled to the locking mechanism 18 through a control output line 32.

Figure 3:
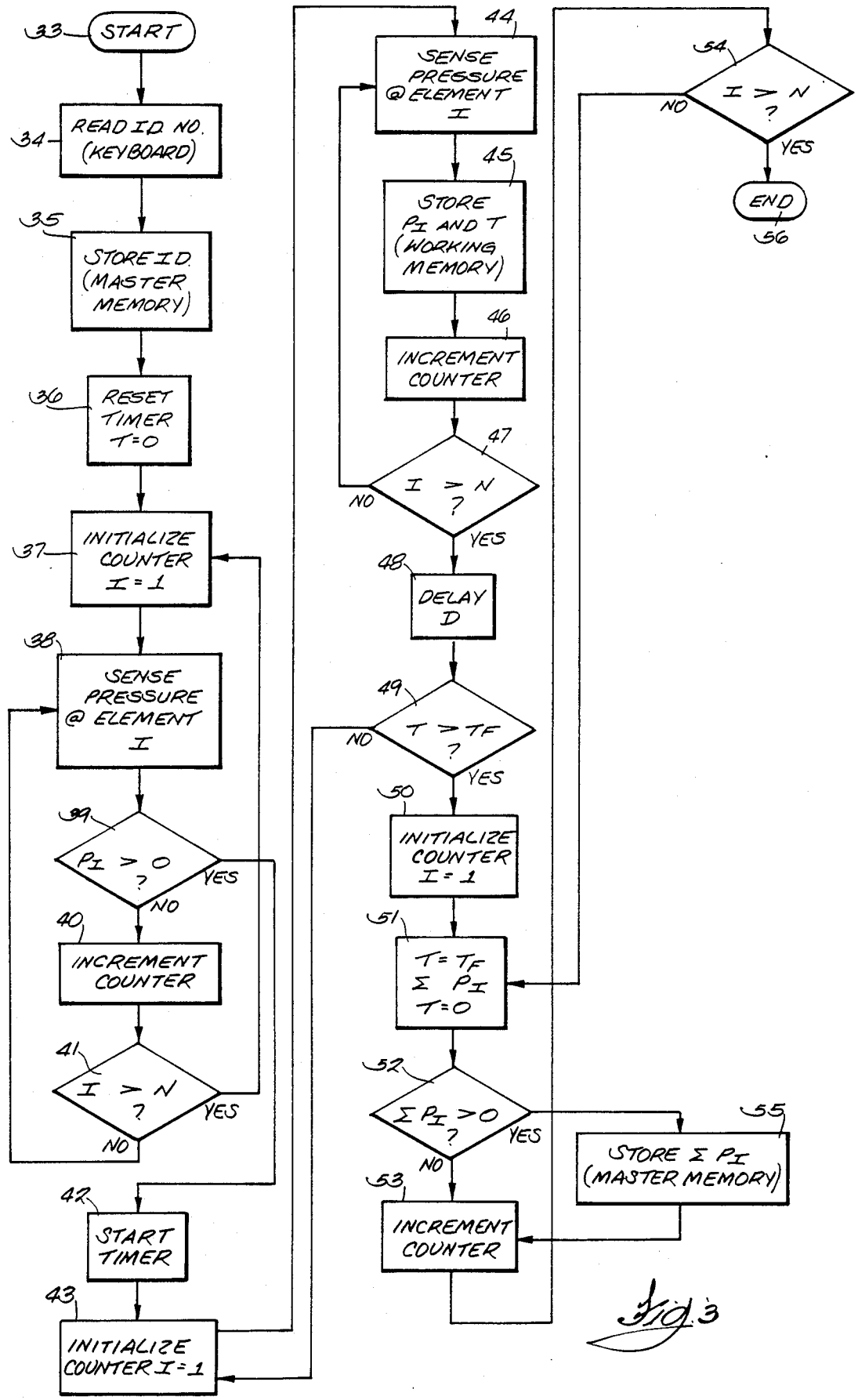
FIG. 3 is a flow chart diagram useful in understanding the operation of the identification system shown in FIGS. 1 and 2 during acquisition of grasping pressure data.

The operation of the identification system 10 during initial acquisition and storage of a particular individual's grasping pressure pattern or "print" can best be understood by reference to the flow chart diagram of FIG. 3. For purposes of this figure, it is assumed that the system has been signalled to operate in a data acquisition or "program" mode and that an individual, whose grasping pressure "print" is to be stored, has been assigned a unique identification number or code and has entered the unique code on the keyboard 19.

System operation begins upon receipt of a "start" command at step 33. Next, the system reads the identification number or code entered on the keyboard 19 at step 34, and the identification number is stored in the master memory 29 at step 35. At the same time, a timer is reset ($T=0$) at step 36 and a counter is initialized ($I=1$) at step 37.

Following storage of the identification number and initialization of the timer and counter, the system then sequentially senses the pressure exerted on each of the pressure sensing elements 13a–13d, which, in a general sense can be represented by a plurality of individual sensor elements $E_1 \ldots E_N$ where N is a fixed constant equal to the total number of pressure sensing elements. At step 38, the system senses the pressure exerted on a particular sensing element $E_I$ where I is the count in the counter. The particular pressure sensing element $E_I$ interrogated at any particular time is, thus, determined by the current or present count I within the counter. Thus, when the count I is equal to 1, a particular pressure sensing element $E_1$ is interrogated. When the count I is incremented, pressure sensing elements $E_1$ through $E_N$ are sequentially interrogated.

To prevent the acquisition and storage of pressure data before the individual has, in fact, grasped the graspable member 11, the system next compares the pressure sensed at the interrogated pressure sensing element $E_1$ against a known minimum threshold pressure. In FIG. 3, the minimum threshold pressure is, for convenience, set to zero. It will be appreciated, however, that, in practice, a non-zero minimum threshold may be preferred.

In the event that pressure $P_I$ sensed at the pressure sensing element is not greater than zero, indicating that the individual has not yet grasped the graspable member 11, the counter is incremented at step 40 after which the count is compared, at step 41, against the fixed constant N, corresponding to the total number of pressure sensing elements. In the event the count I has not exceeded the total number of pressure sensing elements N, control returns once again to step 38 wherein the pressure at the pressure sensing element corresponding to the present count I is sensed and compared against the minimum threshold. In this manner, each of the pressure sensing elements $E_1$ through $E_N$ is interrogated and the resulting sensed pressures compared against the minimum threshold. When the count I exceeds the number of pressure sensing elements N, as determined at step 41, control reverts to step 37 wherein the count I is once again initialized to 1.

So long as the pressure sensed by each of the pressure sensing elements $E_1$ through $E_N$ remains less than the minimum threshold, control remains within the loop defined by steps 37 through 41. Each of the pressure sensing elements is sequentially interrogated until such time as the system, at step 39, determines that one of the pressure sensing elements has sensed a pressure greater than the minimum threshold indicating that the individual has grasped the graspable member 11.

When it is determined at step 39 that one of the pressure sensing elements has sensed a pressure greater than the minimum threshold, the system proceeds to step 42 wherein the previously reset timer is started. Next, the counter is once again initialized to I=1 at step 43, after which the pressure at the pressure sensing element corresponding to I=1 is sensed at step 44. Once this pressure is sensed, both it, $P_I$, and the time, T, established by the timer are stored in the working memory 31 at step 45. Next, the counter is incremented at step 46 and the current or present count I is compared against the total number of pressure sensing elements N at step 47.

In the event the present count I does not exceed the number of elements N, control reverts to step 44 and the pressure sensed at the element corresponding to the current I is also stored in the working memory along with the current time T at step 45. The counter is once again incremented at step 46 and operation in the loop defined by steps 44 through 47 continues until such time as each of the elements is interrogated as indicated by the count I exceeding the number of elements N.

When it is determined at step 47 that the count I exceeds the number of elements N, a predetermined delay D is introduced at step 48 and the total elapsed time T, as determined by the timer, is compared against a fixed time limit $T_F$ at step 49.

In the event the total elapsed time T does not exceed the fixed time limit $T_F$, system control returns to step 43 wherein the count I is once again initialized to I=1. Each of the pressure sensing elements is then again interrogated and the resulting pressures $P_I$ and corresponding times T are stored in the working memory in steps 44 through 49. Operation in this manner continues until such time as the total elapsed time T exceeds the fixed time limit $T_F$. Preferably, the fixed time limit $T_F$ is selected so that each of the pressure sensing elements is interrogated several times over the entire period and a multitude of pressure data are stored in the working memory 31.

When it is determined at step 49 that the elapsed time T is greater than the fixed time limit $T_F$, data acquisition is complete and the acquired raw data are processed for storage by the identification system 10. Although various data processing techniques are suitable, in the illustrated embodiment the system operates to integrate and store the pressure sensed by each of the pressure sensing elements over the time interval of T=0 through T=$T_F$.

To this end, the counter is once again initialized to I=1 at step 50, and the individual pressures $P_I$ sensed by the pressure sensing element corresponding to I are added to step 51 to yield a total sum pressure ($\epsilon P_1$) for the particular pressure sensing element.

In the event a particular pressure sensing element is not acted upon by the individual's hand over the entire period during which the individual grasps the graspable member 11, no useful information is provided by that particular pressure sensing element. In order to avoid wasting valuable memory space storing such useless data, the sum total pressure for each of the pressure sensing elements is compared, at step 52, against a minimum threshold pressure. For convenience, the minimum threshold pressure in the illustrated embodiment is selected to be zero. It will be appreciated, however, that in practice, it may be desirable to select a non-zero minimum threshold.

In the event the sum total pressure sensed by a particular pressure sensing element does not exceed the minimum threshold, the counter is incremented at step 53, and the count I is compared at step 54, against the total number N of pressure sensing elements. In the event the count I does not exceed the number of elements N, control returns to step 51 and the pressures sensed by the pressure sensing element $E_I$ corresponding to the incremented count I are summed at step 51.

In the event it is determined, at step 52, that the sum of the pressures sensed by a particular pressure sensing element exceeds the minimum threshold, the sum is stored, at step 55, in the master memory 29 after which the counter is incremented at step 53. When it is determined, at step 54, that the count I exceeds the total number N of pressure sensing elements, acquisition of the individual's grasping pressure "print" is complete and system operation comes to a halt at step 56. It will be appreciated that only those data which convey useful information about the individual's grasping pressure "print" will be stored in the master memory 29. Similarly, it will be appreciated that the precise location of the individual's hand on the graspable member is not critical as data from non-activated pressure sensors are ignored.

Operation of the identification system during verification of an individual's identity can best be understood by reference to the flow chart diagram of FIG. 4. For purposes of FIG. 4, it is assumed that the system has been signaled to operate in an identification verification mode and that an individual's grasping pressure "print" has been previously acquired and stored in the master memory 29. It is also assumed that the individual has entered his particular identification number or code on the keyboard 19 and that the individual will thereafter grasp the graspable member 11.

During verification of an individual's identity, several of the system operating steps, particularly as they pertain to acquisition of grasping pressure data by the graspable member 11, are similar or identical to the corresponding steps performed during initial acquisition of the individual's grasping pressure "print". Accordingly, in FIG. 4, steps 63 through 85 generally correspond to steps 33 through 55 previously described with regard to FIG. 3 except that in steps 65, 75 and 85, the working memory 31 is substituted for the master memory 29.

In FIG. 4, the grasping pressures exerted by the individual in grasping the graspable member 11 are sensed, processed and stored in substantially the same manner as described with regard to FIG. 3, with the exception that the final resultant is stored, at step 85, in the working memory 31 rather than in the master memory 29. Assuming that the individual is, in fact, the individual associated with the particular ID number or code entered on the keyboard 19, a comparison of the recently acquired grasping pressure data in the working memory 31 against the previously acquired grasping pressure data in the master memory 29 should yield a high probability that both data sets were generated by the same individual. Again it will be appreciated that, because data from non-activated pressure sensors are ignored, correspondence between two pressure data sets generated by the same individual will be determined even though the precise location of the individual's hand on the graspable member was not the same during acquisition of each of the data sets.

To verify the identification of the individual, the system, at step 86, uses the identification number or code entered on the keyboard 19 to retrieve, from the master storage memory 29, the previously acquired sum total pressures $P_I$ sensed by the individual pressure sensing elements. At step 87, data in the master memory are individually compared with the corresponding data in the working memory and, at step 88, the probability that the two data sets were generated by the same individual is calculated. Although various suitable algorithms are available for performing the desired calculation, in the illustrated embodiment, the absolute algebraic differences between corresponding data from the master memory and working memory are first calculated and then summed. The total sum thus calculated is inversely related to the probability that the two data sets were, in fact, generated by the same individual. At step 89, the system compares the sum of the absolute differences between the corresponding data against a predetermined probability constant C to determine the overall probability that both data sets were, in fact, generated by the same individual. If such probability is sufficiently great, the desired control effect is generated at step 90. If such probability is not sufficiently great, system operation terminates at step 91 without generation of the control effect.

The construction of the graspable member 11 is best illustrated in FIGS. 5 and 6. As illustrated, the graspable member 11 comprises a rigid mandrel or base support 100 having an arcuate surface 101 sized and shaped so as to be easily graspable by the human hand.

In the embodiment illustrated in FIG. 5, pressure sensing is accomplished by means of a metallic conductor grid 102 separated, by a compressible resistive layer 103, from a source of electrical potential in the form of a reference electrode 104. The compressible layer 103 is formed of a material whose electrical impedance or resistance varies in accordance with the degree of mechanical compression. Preferably, the reference electrode 104 comprises a flexible layer of electrically insulating material 106 having a surface on which a continuous film 107 of electrically conducting material is deposited. Both the insulating layer and the conducting film are wrapped over the outer surface 101 of the mandrel 100 such that the insulating material 106 is adjacent the mandrel outer surface 101. An electrical terminal 108, connected to the conducting film 107, is also formed on the layer of insulating material 106 and provides a connection point through which an electrical potential can be applied to the conductive film 107.

The metallic conductor grid 102 is similar in construction to the reference electrode 104 and also comprises a flexible insulating layer 109 having a surface on which a plurality of individual, line segment-like, electrical conductors 111 are deposited. As shown, the conductors 111 comprise a plurality of elongate, vertical, electrically conductive strips disposed in spaced parallel relationship to one another over one surface of the insulating layer 109. Each of the conductive strips 111 is electrically isolated from the remaining strips and is connected to one of a plurality of electrical terminals 112, also deposited on the insulating layer 109, by means of a similarly deposited conductive lead line 113.

For purposes of clarity, the parallel conductors in FIG. 5 are illustrated as being comparatively widely spaced from one another. In practice, it is desirable to space the conductors 111 as closely as possible in order to improve the resolution of sensed pressures. By way of example, a conductor spacing of 1/10 inch on center (i.e., 10 conductors per inch), should provide adequate pressure sensing resolution.

As further shown in FIG. 5, the conductors 111 are disposed on the side of the insulating layer 109 which faces the outer surface 101 of the mandrel 100.

The compressible resistive layer 103 also comprises a substantially rectangular sheet dimensioned and shaped so as to be snugly sandwiched between the source of electrical potential 104 and the conductor grid 102 when these three elements are bonded onto the outer surface 101 of the mandrel 100 as best illustrated in FIG. 6. When so configured, each of the conductors 111 is separated from the conducting film 107 by the compressible resistive layer 103. Accordingly, the electrical impedance or resistance between each of the conductors 111 and the conducting film 107 is substantially determined by the resistance of the portion of the compressible layer 103 disposed immediately between each conductor 111 and the conducting film 107. In the event pressure is externally applied to the outer surface of the graspable member, the conductors 111 are displaced inwardly toward the conducting film 107 by a distance related to the magnitude of the externally applied force. At the same time, the compressible resistive layer 103 is locally compressed and the resistance between a particular one of the conductors 111 and the conducting film 107 varies in accordance with the degree of compression. Accordingly, the resistance between each of the conductors 111 and the conducting film 107 is a function of the pressure externally exerted on that particular conductor, and measurement of the resistance between each of the conductors and the reference electrode provides an indication of the location and magnitude of the forces externally applied on the grasping surface.

By applying a known potential across each of the conductors 111 and the conducting film 107, and by measuring the resulting current through each of the conductors 111, an electrical analog signal indicative of the grasping pressure pattern or "print" can be developed as an individual grasps the graspable member 11.

An alternative embodiment of the graspable member is illustrated in FIG. 7. In this embodiment, the mandrel 100, as well as the conductor grid 102 and the compressible layer 103, remain the same, and an additional conductor grid 116 replaces the reference electrode 104 between the compressible layer 103 and the outer surface 101 of the mandrel 100. Although the general construction of the second conductor grid 116 is substantially similar to the construction of the first conductor grid 102, the second conductor grid includes a plurality of individual conductors 117 which, unlike the conductors 111 of the first conductor grid 102, extend substantially horizontally.

In the FIG. 7 embodiment pressure sensing can be obtained over more-localized areas than is possible with the FIG. 6 embodiment. By individually and sequentially measuring the resistance between all pair combinations of the vertical conductors 111 with the horizontal conductors 117, pressure data, from each of the points defined by the intersections of the vertical and horizontal conductors, can be obtained.

Thus, in the embodiment of FIG. 7, pressure sensing is not only accomplished in the horizontal direction around the outer surface 101 as is the case in the FIG. 5 embodiment, but is also performed in the vertical direction from top to bottom along the mandrel outer surface 101. Accordingly, the predetermined locations for sensing grasping pressures in the alternative embodiment of FIG. 7 are more point-like in form than are the substantially line segment-like locations in the embodiment of FIGS. 5 and 6. The FIG. 7 embodiment, therefore, provides additional data points which improves the sensing resolution of the graspable member 11 and thereby permits more precise verification of an individual's identity.

In either of the FIG. 5 or FIG. 7 embodiments, it may be desirable to provide a flexible, protective coating or covering (not shown) over the entire assembly of layers in order to protect the layers and provide the graspable member 11 with a durable outer surface.

It will be appreciated that many modifications and variations can be made without departing from the invention in its broader aspects. For example, although the identification system 10 has been shown and described in the context of controlling access through a doorway, it will be appreciated that the system can be readily adapted to many applications, such as credit card transactions, or electronic banking, wherein it is desirable to verify the identity of an individual. Furthermore, although a particular analytical technique for processing and storing raw data has been described, it will be appreciated that various other data processing techniques can be utilized without departing from the scope of the invention. Finally, although particular constructions of a graspable member operable to sense the magnitude and pressure of external forces thereon applied have been described, it will be appreciated that other pressure sensing techniques, such as those based on piezoelectric or fiber optic principles such as microbending of individual fibers, can be utilized to obtain the raw grasping pressure data.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A device for identifying an individual comprising:
a non-uniplanar member; and
sensing means for sensing the pressure exerted at preselected locations on said non-uniplanar member when said non-uniplanar member is grasped by the individual's hand.

2. A device according to claim 1 wherein said sensing means develops a signal indicative of the magnitude and relative location of the pressures exerted at said preselected locations when said member is grasped by the individual's hand.

3. A device according to claim 2 wherein said device further comprises storage means for storing said signal and for retrieving said signal for use subsequent to development of said signal by said sensing means.

4. A device according to claim 3 wherein said device further comprises comparator means for retrieving said stored signal from said storage means, comparing said stored signal against a subsequently acquired signal developed by said sensing means, and for developing a control effect when said subsequently acquired signal substantially matches said stored signal.

5. A device according to claim 4 wherein said device further comprises user input means for receiving a prearranged input code uniquely associated with a particular individual and for retrieving from said storage means a particular one of said stored signals for comparison by said comparator means against a currently developed signal developed by said sensing means such that said control effect is developed if said currently developed signal matches said particular signal associated with the particular individual.

6. A system for verifying the identity of an individual, comprising:
a non-uniplanar member;
an array of pressure sensing elements disposed at preselected locations on said non-uniplanar member and operable to sense the magnitude of pressures externally applied to said graspable member at said preselected locations;
signal means coupled to said sensing elements for developing a signal indicative of the magnitudes and locations of the pressures exerted on said non-uniplanar member when said non-uniplanar member is grasped by the individual's hand;
storage means for storing a previously acquired signal indicative of the magnitude and location of pressures exerted by an individual's hand in grasping a member similar or identical to said non-uniplanar member; and
comparator means for comparing said signal against said previously acquired signal so as to provide a control effect when said signal and said previously acquired signal are substantially similar.

7. A system according to claim 6 wherein said non-uniplanar member comprises a mandrel dimensioned so as to be readily graspable by an individual's hand and formed of a rigid, relatively non-deformable material.

8. A system according to claim 7 wherein said mandrel includes an outer surface and said pressure sensing elements are disposed over said mandrel at fixed locations on said outer surface.

9. A system according to claim 8 wherein said pressure sensing elements comprise a plurality of electrical conductor pairs and wherein each of said conductor pairs comprises a pair of electrical conductors separated by a deformable resistive material such that the electrical impedance between said conductors in each of said pairs is indicative of the pressure exerted on said conductor pair.

10. A system according to claim 8 wherein said sensing elements are each elongate in form and wherein said preselected locations comprise a plurality of substantially parallel spaced line segments on said outer surface of said mandrel.

11. A system according to claim 8 wherein said sensing elements are substantially point-like in form and wherein said preselected locations comprise a plurality of spaced points on said outer surface of said mandrel.

12. A method of identifying an individual comprising the steps of:
providing a non-uniplanar member; and
sensing the magnitudes and relative locations of pressures exerted on said member by the individual's hand when said member is grasped by the individual.

13. A method according to claim 12 further comprising the steps of comparing said sensed magnitudes and relative locations of pressures exerted on said member by the individual's hand against a previously acquired reference and providing a control effect when said sensed magnitudes and relative locations substantially match said previously acquired reference.

14. A system for identifying an individual comprising:
a graspable member;
sensing means for sensing the pressures exerted at preselected locations on said graspable member when said graspable member is grasped by the individual's hand, said sensing means being operable to develop a signal indicative of the magnitude and relative location of the pressures exerted at said preselected locations when said graspable member is grasped by the individual's hand;
storage means for storing said signal and for retrieving said signal for use subsequent to development of said signal by said sensing means;
comparator means for retrieving said stored signal from said storage means, comparing said stored signal against a subsequently acquired signal developed by said sensing means, and for developing a control effect when said subsequently acquired signal substantially matches said stored signal; and
user input means for receiving a prearranged input code uniquely associated with a particular individual and for retrieving from said storage means a particular one of said stored signals for comparison by said comparator means against a currently developed signal developed by said sensing means such that said control effect is developed if said currently developed signal matches said particular signal associated with the particular individual.

15. A system according to claim 14 wherein said graspable member comprises a mandrel shaped and dimensioned to be readily graspable by an individual's hand and formed of a rigid, relatively non-deformable material.

16. A system according to claim 15 wherein said mandrel includes an outer surface and said pressure sensing elements are disposed over said mandrel at fixed locations on said outer surface.

17. A system according to claim 16 wherein said pressure sensing elements comprise a plurality of electrical conductor pairs and wherein each of said conductor pairs comprises a pair of electrical conductors separated by a deformable resistive material such that the electrical impedance between said conductors in each of said pairs is indicative of the pressure exerted on said conductor pair.

18. A system according to claim 16 wherein said sensing elements are each elongate in form and wherein said preselected locations comprise a plurality of substantially parallel spaced line segments on said outer surface of said mandrel.

19. A system according to claim 16 wherein said sensing elements are substantially point-like in form and wherein said preselected locations comprise a plurality of spaced points on said outer surface of said mandrel.

20. A method of identifying an individual comprising the steps of:
providing a graspable member;
sensing the magnitudes and relative locations of pressures exerted on said graspable member by the individual's hand when said graspable member is grasped by the individual;
comparing said sensed magnitudes and relative locations of pressures exerted on said graspable member by the individual's hand against a previously acquired reference; and
providing a control effect when said sensed magnitudes and relative locations substantially match said previously acquired reference.

* * * * *